March 29, 1949.   M. JENSEN   2,465,538
POWER TRANSMISSION MEANS
Filed May 29, 1944   2 Sheets-Sheet 2
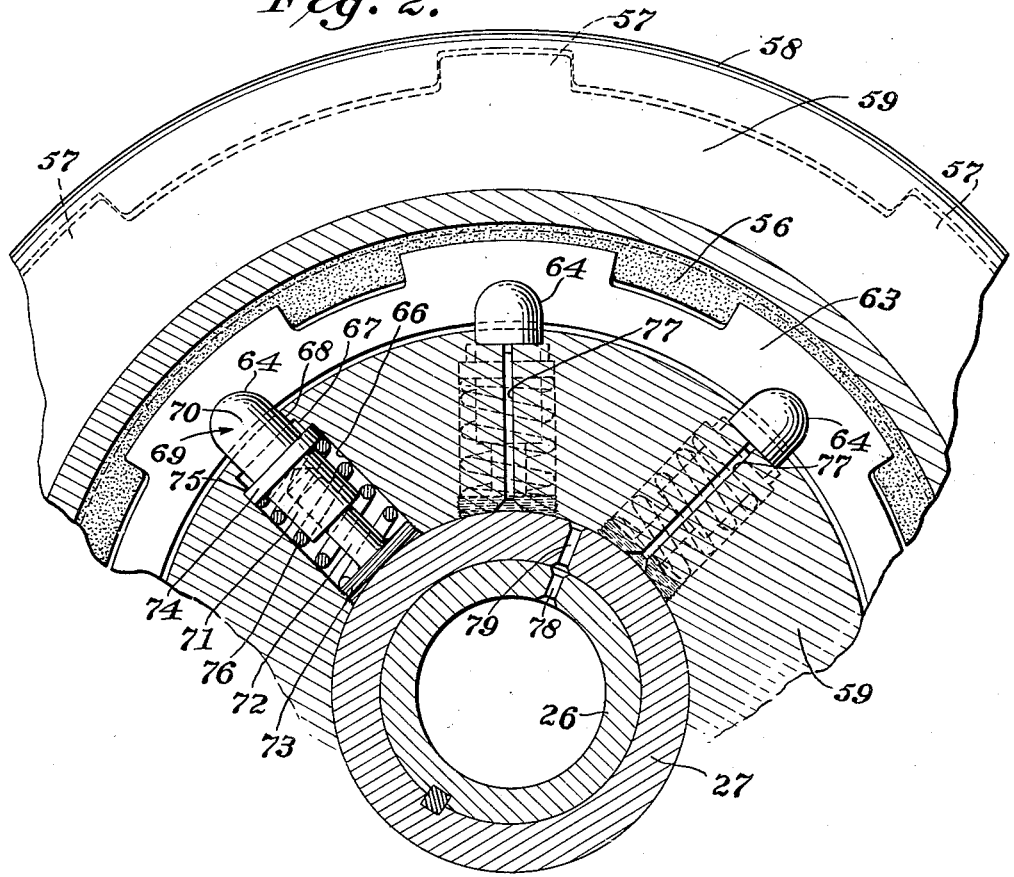
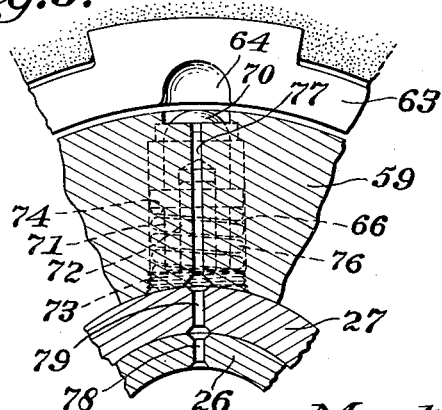
Inventor:
Martin Jensen,
By Cushman Darby Cushman
Attorneys.

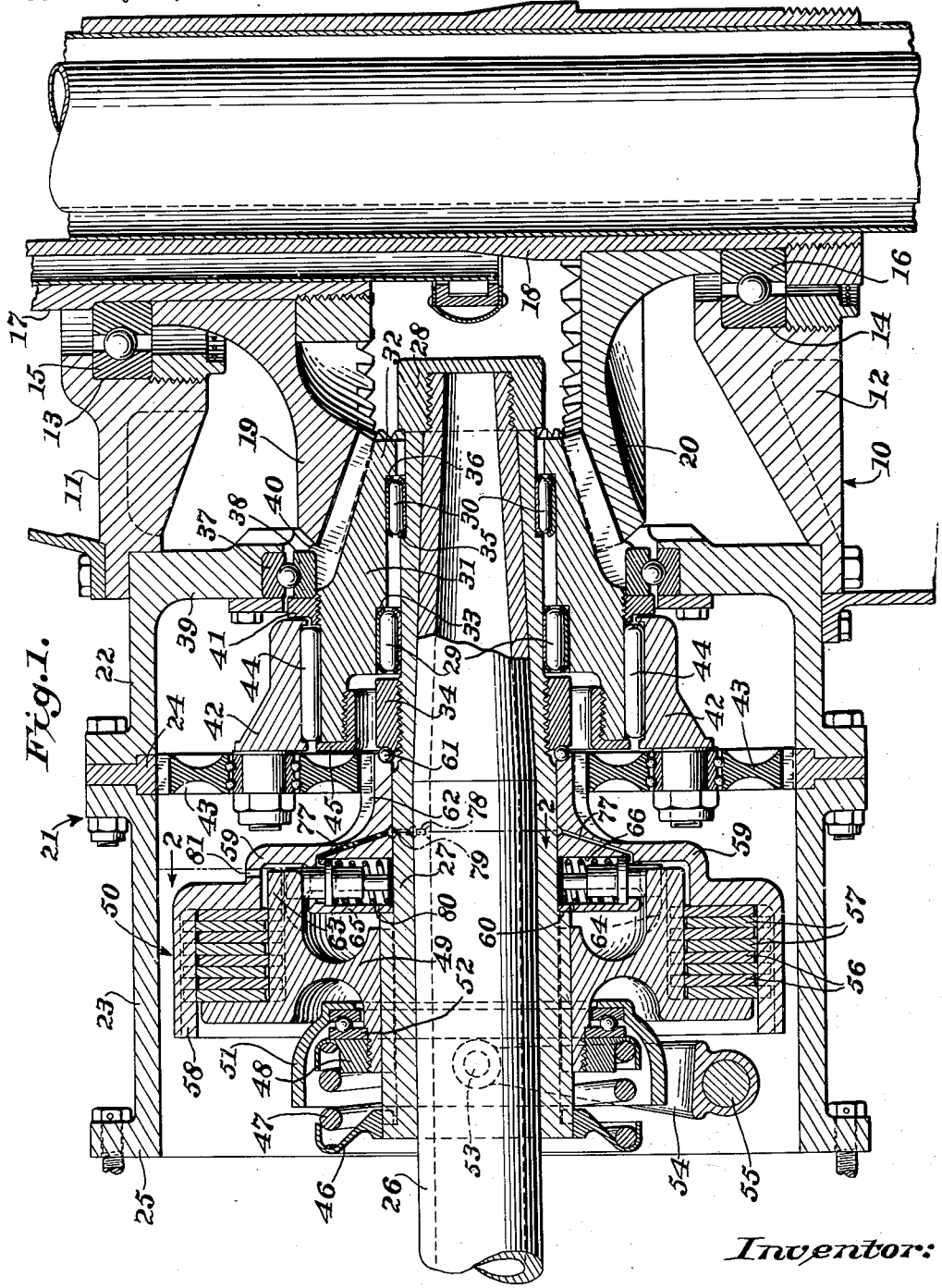

Patented Mar. 29, 1949

2,465,538

UNITED STATES PATENT OFFICE 2,465,538

POWER-TRANSMISSION MEANS

Martin Jensen, New York, N. Y., assignor to Helicopters, Inc., a corporation of Delaware Application May 29, 1944, Serial No. 537,905

10 Claims. (Cl. 192—53)

1

This invention relates to power transmission means including clutch devices designed to meet the problems peculiar to the drive of helicopter rotors, and while the description will be made with particular reference to such an association, it will be understood that the invention may be applied in any other appropriate situation.

In a helicopter, the engine should be disconnectible from the rotor or rotors so as to be able to be started and run independently thereof. For this purpose a slipping clutch, such as a friction clutch, is desirable, since after the engine is running the clutch can be engaged to bring the rotor gradually from rest to operating speed. If an ordinary positive clutch is provided, then the rotor must be brought to speed by auxiliary power means before the clutch is engaged. At the same time, a positive drive is desirable during flight, for obvious reasons. Reduction gearing must be provided since the rotor speed is less than efficient engine speed. Upon engine failure, it is desirable for the rotor to be automatically uncoupled from the engine so as to be able to rotate freely and enable a parachute landing to be made.

In accordance with the present invention, I provide a compact and relatively simple transmission unit including a friction clutch through which the rotor can be brought to speed, a positive clutch to take over after the rotor is brought to speed, reduction gearing, and an overrunning clutch which immediately uncouples the rotor upon engine failure. Such a unit is shown in the accompanying drawings with reference to which the description will proceed.

In the drawings:

Figure 1 is a vertical axial section of power transmission means in accordance with the invention.

Figure 2 is a fragmentary section on enlarged scale substantially on line 2—2 of Figure 1, and Figure 3 shows a portion of the apparatus of Figure 2 with parts in a different relation.

For the purpose of the present description, I have shown the new power transmission means arranged for the drive of contra-turning rotors, such as are disclosed in the application of Vincent Bendix, Serial No. 511,408, filed November 23, 1943 now Patent No. 2,456,485, December 14, 1948. As in that application, reference numeral 10 designates a casing having top and bottom walls 11

2 and 12 provided with vertically aligned openings 13 and 14 in which are disposed ball bearing assemblies 15 and 16 for an outer torque tube 17 and an inner torque tube 18 by which the rotors are driven. Fixed to the tube 17 is a downwardly faced bevel gear 19 and fixed to the tube 18 is an upwardly faced bevel gear 20 of the same size as the first.

Fixed against the open end of casing 10 is an annular casing extension 21 comprising the two parts 22 and 23 between which is clamped an orbit gear 24. The end 25 of section 23 is adapted to be bolted to the crank case of an engine having a hollow power or crank shaft 26 which intersects the axis of tubes 17 and 18 at right angles thereto and midway between gears 19 and 20.

Shaft 26 has keyed thereon a sleeve 27 which is retained by a cap nut 28. Rotatable on the outer end portion of shaft 26 through roller bearing assemblies 29 and 30 is a sleeve 31 formed at its inner end as a bevel pinion 32 engaging gears 19 and 20. Assembly 29 is retained in position by a shoulder 33 of sleeve 31 and by a ring 34 threaded on raised threads of sleeve 27. Assembly 30 is retained in position by a shoulder 35 of sleeve 27 and a shoulder 36 of sleeve 31. For the support of the extremity of shaft 26, I provide a ball bearing assembly including races 37 and 38, of which the former is carried by an inwardly extending annular flange 39 of the casing extension portion 22. Race 38 is held in abutment with a shoulder 40 of sleeve 31 by a ring 41 threaded on raised threads of the latter.

Reference numeral 42 designates an annular carrier for planet pinions 43, the carrier embracing the outer portion of sleeve 31 to provide an overrunning clutch which includes the rollers 44 which are retained by annular shoulders on the carrier and by a flanged ring 45 threaded in an end enlargement of sleeve 31.

Fixed at the outer end of sleeve 27 is an abutment 46 for a compression spring 47 whose other end engages a seat provided by a ring 48 which is threaded on the driving member 49 of a friction clutch generally designated at 50, the said member 49 being splined on sleeve 27. Reference numeral 51 designates a clutch shifting collar, between which and ring 48 is interposed a ball bearing assembly 52. Collar 51 is provided with opposite horizontally extending pins as at 53 engaged by the arms as at 54 of a shipper member which is fixed on an operating shaft 55 journalled in section 23, the shaft being equipped externally of section 23 with operating means such as a lever, so that it may be rocked to compress spring 47 and disengage clutch 50.

The drive member 49 has splined thereon a number of clutch discs 56 which are interleaved with clutch discs 57 splined in an annular flange 58 of a driven clutch member 59 which is freely rotatable on sleeve 27 and positioned on the one hand by a shoulder 60 of sleeve 27 and on the other by balls 61 between it and ring 34. Member 59 is provided at its inner end with teeth 62 engaging the planets 43.

Member 49 is provided with an annular extension 63 in which are formed a number of equi-distantly spaced axially extending grooves 64, Figures 1, 2 and 3, which are open at the right, Figure 1. The member 59 has an extension 65 which in the closed condition of clutch 50 lies within the extension 63 of member 49 as shown in Figure 1. Extension 65 has formed therein a number of radial bores 66 equal in number to the grooves 64 and equi-distantly spaced. Each bore 66 runs outwardly into an intermediate counterbore 67 and into a terminal counterbore 68 and in each bore is a dog in the form of a plunger 69 having a cylindrical head portion 70 slidable in the bore portion 68. Each plunger 70 has a cylindrical base portion 71 provided with an axial bore in which is slidably received a guide pin 72 fixed to a base disc 73 threaded in the inner end of a bore 66. Between its head and base portions each plunger 70 has an integral annular rib or flange 74 slidably received in bore 66 and normally urged against the shoulder 75, which is between bores 66 and 67, by a compression spring 76 which bears at one end against rib 74 and at the other against base portion 73. With the plungers registering with grooves 64, their rounded extremities are normally engaged therein due to their projection by the springs 76, as particularly shown in Figure 2.

Associated with each plunger is a passage or duct 77, Figures 1, 2 and 3, which is formed in member 59 and extends from the bore portion 67 and terminates at sleeve 27 which is, in effect, a part of shaft 26. Formed in the shaft and sleeve are aligned radial ducts 78 and 79 which in the engaged position of plungers 69 are out of register with all of ducts 77, Figure 2. However, all of the ducts terminate in the radial plane which includes duct 78, 79. The oil from the usual oil pressure system with which the hollow shaft 26 is connected is prevented from escape through the duct 78, 79 when in the position shown in Fig. 2 by the overlying surface of member 59.

With the parts in the relation shown in Figures 1 and 2, there is a positive drive from member 49 to member 59, due to the engagement of plungers 69 in the grooves 64. Consequently, with the engine in operation, there is a positive drive to and through the planet carrier and overrunning clutch means 44 to sleeve 31 and the two gears 19 and 20 are oppositely driven. If clutch 50 is now moved toward disengagement, the positive drive of member 59 will continue until grooves 64 pass to the left, Figure 1, away from plungers 69. After this has occurred, there will be relative rotation between shaft 26 and member 59, and consequently the duct 78, 79 will intermittently pass all of the ducts 77, as indicated in Figure 3, so that pressure fluid applied through the hollow shaft 26 by the usual oil pressure system of the engine will be injected into the bore portions or cylinders 67, and acting on ribs 74 as pistons, will move the plungers inwardly and will hold them there as long as the relative rotation continues. If clutch 50 is moved toward engagement by spring 47, the speed of member 59 will gradually approach the speed of member 49 and just before equal speed is reached, the difference in the relative speeds of members 49 and 59 will have become so slight and thus the retractive impulses on the plungers so few, that seepage of the pressure fluid past the heads 70 of the plungers, or past the piston portions 74, will permit the projection of the plungers by the springs 76 and centrifugal force so that the plungers will be engaged in grooves 64 to afford positive drive with the parts again in the position of Figures 1 and 2. Oil below the piston portions 74 can escape through openings 80. Leakages pass from member 59 through openings 81 and serve to lubricate the gearing.

It will thus be seen that when the friction clutch is opened, the positive clutch is also opened and the engine can run free; that the friction clutch can be closed to bring the rotors gradually to speed; and that after this has substantially occurred, the positive clutch means automatically takes over. Efficient reduction is provided during either drive by the planetary gearing. Should the engine fail, the overrunning clutch means immediately releases so as to permit the free rotation of the rotors.

A particular feature of the described transmission means when used in the drive of a helicopter rotor is that the friction clutch need have only enough capacity to bring the rotor to speed with the rotor at zero pitch, and hence the friction clutch can be made small and light. The strain of driving the rotor at positive pitch is taken over by the positive clutch.

I, of course, do not limit myself to the described details of structure, variations in the form and arrangement of parts being possible and contemplated in the combinations and subcombinations hereinafter claimed.

I claim:

1. Power transmission means comprising a driving member and a driven member, normally engaged friction clutch means between the two members, means for relatively displacing said members to disengage said friction clutch means, an abutment on one of said members, a retractible dog on the other of said members normally engaging said abutment for the positive drive of said drive member, the arrangement being such that the relative displacement of said members causes disengagement of said dog and abutment by movement of said abutment out of the range of movement of said dog, means operating upon relative rotation of said members for retracting said dog to prevent engagement thereof with said abutment during return of said members to normal position and means for thereafter returning said dog to engaged position.

2. Power transmission means comprising a driving member and a driven member, normally engaged friction clutch means between the two members, means for relatively displacing said members to disengage said friction clutch means, an abutment on one of said members, a radially retractible dog on the other of said members normally engaging said abutment for the positive drive of said driven member, the arrangement being such that the relative displacement of said members causes disengagement of said dog and abutment, means operating upon the relative rotation of said members for retracting said dog to prevent engagement thereof with said abutment during return of said members to normal position and means for thereafter returning said dog to engaged position.

3. Power transmission means comprising a driving member and a driven member, friction clutch means between the two members, means for relatively displacing said members to disengage and re-engage said friction clutch means, an abutment on the driving member, a retractible dog on the driven member adapted to engage said abutment for the positive drive of said driven member, the arrangement being such that the relative displacement of said members to disengage said friction clutch also causes disengagement of said dog and abutment, cylinder and piston means associated with said dog, means for supplying pressure fluid to said cylinder and piston means upon relative rotation of said members whereby to retract said dog, and means for returning said dog when said relative rotation ceases.

4. Power transmission means comprising a hollow drive shaft adapted to be supplied with pressure fluid, a clutch comprising a drive member and a driven member on said shaft, friction clutch means between the two members, means for relatively displacing said members to disengage and re-engage said friction clutch means, an abutment on said drive member, a retractible dog on the driven member adapted to engage said abutment for the positive drive of said driven member, the arrangement being such that the relative displacement of said members to disengage said friction clutch also causes disengagement of said dog and abutment, cylinder and piston means associated with said dog, a passage in said driven member leading from said cylinder and piston means and terminating at said shaft, a radial opening in said shaft normally out of register with said passage but intermittently registering therewith upon relative rotation of said members whereby to admit pressure fluid from said hollow shaft to said cylinder, and piston means actuated by said pressure fluid to retract said dog out of range of said abutment, and means for returning said dog when said relative rotation ceases.

5. Power transmission means comprising a hollow drive shaft adapted to be supplied with pressure fluid, a clutch comprising a drive member and a driven member on said shaft, friction clutch means between the two members, means for relatively displacing said members to disengage and re-engage said friction clutch means, an abutment on said drive member, a radial bore in said driven member, a plunger slidable in said bore and adapted to engage said abutment for the positive drive of said driven member, said plunger having an annular enlargement in said bore and constituting a piston, a passage in said driven member leading from said bore outwardly of said enlargement and terminating at said shaft, a radial opening in said shaft normally out of register with said passage but intermittently registering therewith upon relative rotation of said members whereby to supply pressure fluid from said hollow shaft to retract said dog out of range of said abutment, and means for returning said dog when said relative rotation ceases.

6. Power transmission means comprising a driving member and a driven member, normally engaged friction clutch means between the two members, normally engaged positive clutch means between the two members, means for disengaging both of said clutch means, and means operating upon relative rotation of said members to provide recurring power impulses acting upon said positive clutch means for maintaining said positive clutch means out of engagement during re-engagement of said friction clutch means and means for effecting re-engagement of said positive clutch means upon cessation of said relative rotation.

7. Means for transmitting power to a helicopter rotor which is adjustable from zero to positive pitch, comprising a driving member in connection with a power source, a driven member in connection with said rotor, friction clutch means between said members of a capacity to bring the driven member to the speed of the driving member when said rotor is at substantially zero pitch, positive clutch means engageable between said members and capable of driving the rotor at all positive pitch adjustments thereof, means operating upon the relative rotation of said members to maintain said positive clutch means out of engagement until the driven member and the driving member rotate together and means for thereupon effecting the engagement of said positive clutch.

8. Means for transmitting power to a helicopter rotor which is adjustable from zero to positive pitch, comprising a driving member in connection with a power source, a driven member in connection with said rotor, friction clutch means between said members of a capacity to bring the driven member to the speed of the driving member when said rotor is at substantially zero pitch, positive clutch means between said members, means operating upon relative rotation of said members to provide recurring power impulses acting upon said positive clutch means for holding said positive clutch means out of engagement and means acting automatically to engage said positive clutch means when the driven member attains the speed of the driving member, said positive clutch means being capable of driving the rotor at all positive pitch adjustments thereof.

9. Power transmission means comprising a driving member and a driven member, friction clutch means between the two members, positive clutch means between the two members, means for disengaging both of said clutch means and re-engaging said friction clutch means and fluid pressure means responsive to relative rotation of said members for maintaining said positive clutch means out of engagement during re-engagement of said friction clutch means until said members rotate substantially in synchronism and for then effecting re-engagement of said positive clutch means.

10. Power transmission means comprising a driving member and a driven member, friction clutch means between the two members, positive clutch means between the two members, means for disengaging both of said clutch means and re-engaging said friction clutch means, and automatic control means comprising portions rotatable respectively with said driving member and driven member and cooperating to provide intermittent power impulses during relative rotation of said members for initially maintaining said positive clutch means out of engagement upon re-engagement of said friction clutch means and means for thereafter effecting re-engagement of said positive clutch means.

MARTIN JENSEN.

REFERENCES CITED

The following references are of record in the file of this patent:

UNITED STATES PATENTS

| Number | Name | Date |
|---|---|---|
| 697,683 | Smith | Apr. 15, 1902 |
| 723,715 | McLennan | Mar. 29, 1903 |
| 1,110,212 | Koontz | Sept. 8, 1914 |
| 1,207,767 | Kennedy | Dec. 12, 1916 |
| 1,250,687 | Smith | Dec. 18, 1917 |
| 1,263,689 | Maire | Apr. 23, 1918 |
| 1,394,448 | Sitney | Oct. 18, 1921 |
| 1,396,426 | Hartford | Nov. 8, 1921 |
| 1,413,987 | Hupp | Apr. 25, 1922 |
| 1,702,753 | Tyler | Feb. 19, 1929 |
| 1,777,480 | Schoonmaker | Oct. 7, 1930 |
| 2,011,401 | Fawick | Aug. 13, 1935 |
| 2,327,740 | Pfister | Aug. 24, 1943 |